(12) United States Patent
Gauger et al.

(10) Patent No.: US 10,948,336 B2
(45) Date of Patent: Mar. 16, 2021

(54) AUTOMATED CONDIMENT DISPENSING SYSTEM WITH PRECISELY CONTROLLED DISPENSED QUANTITIES

(71) Applicant: A. J. ANTUNES & CO., Carol Stream, IL (US)

(72) Inventors: Steve Gauger, Crystal Lake, IL (US); Margaret Naden, Forest Park, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 0 days.

(21) Appl. No.: 16/549,349

(22) Filed: Aug. 23, 2019

(65) Prior Publication Data

US 2020/0072657 A1  Mar. 5, 2020

Related U.S. Application Data

(60) Provisional application No. 62/725,684, filed on Aug. 30, 2018.

(51) Int. Cl.
*G01G 15/04* (2006.01)
*A47J 47/01* (2006.01)

(52) U.S. Cl.
CPC .............. *G01G 15/04* (2013.01); *A47J 47/01* (2013.01); *G01G 2015/045* (2013.01)

(58) Field of Classification Search
CPC .. G01G 15/04; G01G 2015/045; G01G 13/18; F16K 7/06; A47J 47/01; A47J 31/404
See application file for complete search history.

(56) References Cited

U.S. PATENT DOCUMENTS

| | | | | |
|---|---|---|---|---|
| 3,710,983 A | * | 1/1973 | Ricciardi | B29B 7/42 222/141 |
| 3,804,298 A | * | 4/1974 | Ricciardi | B65G 65/46 222/56 |
| 4,127,220 A | * | 11/1978 | Werthaiser | G01G 13/24 141/83 |
| RE32,101 E | * | 4/1986 | Ricciardi | G05D 7/0611 177/185 |
| 4,893,262 A | * | 1/1990 | Kalata | G01G 11/08 177/59 |
| 6,168,305 B1 | * | 1/2001 | Marmsater | G01G 11/086 177/25.13 |

(Continued)

*Primary Examiner* — Vishal Pancholi
*Assistant Examiner* — Bob Zadeh
(74) *Attorney, Agent, or Firm* — Law Offices of Steven W. Weinrieb; Steven W. Weinrieb

(57) ABSTRACT

An automated condiment dispensing system for dispensing predetermined amounts of condiments such as are commonly utilized in connection with the preparation of food sandwiches or other food menu items, particularly within fast food restaurants, whereby a particular condiment, or a combination of condiments, can be automatically dispensed onto a food sandwich or food item transported to a particular condiment dispensing station at which the particular condiment dispensing system is located and from which the particular condiment is to be dispensed. Multiple different condiment dispensing stations can be employed so as to dispense different condiments in accordance with a patron's food item order, and the entire dispensing system is automatically controlled by a programmable logic controller (PLC).

19 Claims, 3 Drawing Sheets

(56) References Cited

U.S. PATENT DOCUMENTS

| | | | | |
|---|---|---|---|---|
| 6,253,959 B1* | 7/2001 | Gaultney | .............. | G01F 13/005 |
| | | | | 222/413 |
| 6,367,417 B1* | 4/2002 | Gal et al. | ............. | A01K 5/0283 |
| | | | | 119/51.5 |
| 9,123,196 B1* | 9/2015 | Salem | ...................... | G07F 11/26 |
| 2005/0102058 A1* | 5/2005 | Reinsch | ................ | G01G 19/38 |
| | | | | 700/231 |
| 2007/0034642 A1* | 2/2007 | Pendleton | .............. | B65G 53/36 |
| | | | | 222/56 |
| 2010/0051643 A1* | 3/2010 | Hara | ...................... | G01G 13/06 |
| | | | | 222/56 |
| 2011/0206797 A1* | 8/2011 | Taniguchi | .............. | B22D 17/32 |
| | | | | 425/587 |
| 2020/0072657 A1* | 3/2020 | Gauger | .................. | A47J 47/01 |

* cited by examiner

AUTOMATED CONDIMENT DISPENSING SYSTEM WITH PRECISELY CONTROLLED DISPENSED QUANTITIES

CROSS REFERENCE TO RELATED PATENT APPLICATION

This patent application is a non-provisional conversion of U.S. Provisional Patent Application No. 62/724,684 which was filed on Aug. 30, 2018, the priority benefits of which are hereby claimed.

FIELD OF THE INVENTION

The present invention relates generally to food service equipment, and more particularly to a new and improved automated condiment dispensing system for dispensing precisely controlled quantities of condiments such as are commonly utilized in connection with the preparation of food sandwiches or other food menu items, particularly within fast food restaurants, whereby a particular condiment, or a combination of condiments, can be automatically dispensed onto a food sandwich or food item transported to a particular condiment dispensing station at which the particular condiment dispensing system is located and from which the particular condiment is to be dispensed. All operations are to be controlled by means of a programmable logic controller (PLC). In addition, multiple different condiment dispensing stations can be employed so as to dispense different condiments in accordance with a patron's food item order, and the entire dispensing system, including the multiple different condiment dispensing stations, is likewise automatically controlled by a programmable logic controller (PLC). Still further, while the present invention is disclosed in connection with fast food restaurants or establishments, the adoption, adaptation, or application of the principles and teachings of the new and improved system of the present invention to other food products or food establishments is also envisioned.

BACKGROUND OF THE INVENTION

Conventionally, when preparing specific food orders, particularly in a fast-food restaurant, food preparation personnel must handle food products in an individual or one-by-one manner when, for example, preparing sandwiches or other food menu items. This is especially true in connection with specific condiments or relishes, such as, for example, shredded lettuce, shredded onions, shredded cheeses, and the like, which are commonly added to hamburger sandwiches or other food menu items in accordance with a particular order by a food patron. One problem with dispensing or depositing condiments onto various different condiments is that the amount of a particular condiment to be applied to a particular food item may vary. In addition, in connection with a particular food item, a combination of condiments may sometimes be required as per the food patron's order. As is also well-known, speed, in connection with the preparation of the particular food item for the patron, as well as accuracy, in connection with the preparation of the particular food item in accordance with the food patron's particular condiment selections, are critical factors to be considered so as to effectively the success of the food establishment.

A need therefore exists in the art for a new and improved piece of food service equipment. An additional need exists in the art for a new and improved piece of food service equipment which is adapted to automatically dispense condiments onto food items being prepared in accordance with the food patron's order. A still additional need exists in the art for a new and improved piece of food service equipment which is adapted to automatically dispense condiments onto food items in precisely controlled, predetermined quantities. A yet additional need exists in the art for a new and improved piece of food service equipment which is adapted to automatically dispense a combination of condiments onto food items in accordance with a food patron's order selections. A still yet additional need exists in the art for a new and improved piece of food service equipment which is adapted to be incorporated within a food preparation system which automatically conveys the food item to selected condiment stations such that selected or required condiments can in fact be dispensed or deposited onto the food item at different condiments dispensing stations as desired by the food patron. A yet still additional need exists in the art for a new and improved piece of food service equipment which is adapted to automatically control the various operations of the condiment dispensing apparatus at a particular condiment dispensing station in order to achieve the speedy and accurate preparation of the particular food item.

Overall Objectives of the Invention

An overall objection of the present invention is to provide a new and improved piece of food service equipment. An additional overall objection of the present invention is to provide a new and improved piece of food service equipment which is adapted to automatically dispense condiments onto food items being prepared in accordance with the food patron's order. A still additional overall objection of the present invention is to provide a new and improved piece of food service equipment which is adapted to automatically dispense condiments onto food items in precisely controlled, predetermined quantities. A yet additional overall objection of the present invention is to provide a new and improved piece of food service equipment which is adapted to automatically dispense a combination of condiments onto food items in accordance with a food patron's order selections. A still yet additional overall objection of the present invention is to provide a new and improved piece of food service equipment which is adapted to be incorporated within a food preparation system which automatically conveys the food item to selected condiment stations such that selected or required condiments can in fact be dispensed or deposited onto the food item at different condiments dispensing stations as desired by the food patron. A yet still additional overall objection of the present invention is to provide a new and improved piece of food service equipment which is adapted to automatically control the various operations of the condiment dispensing apparatus at a particular condiment dispensing station in order to achieve the speedy and accurate preparation of the particular food item.

SUMMARY OF THE INVENTION

The foregoing and other objectives of the present invention are achieved in accordance with the principles and teachings of the present invention through the provision of a new and improved condiment dispensing system which comprises a hopper mechanism within which an auger-type conveyor is rotatably disposed and which is located at a condiment dispensing station. A condiment charging bin is removably disposed atop a hopper so as to facilitate the cleaning, maintenance, or repair, of both the bin and/or hopper as may be periodically required, and a condiment conveyor which may be, for example, a rotary auger, is rotatably disposed within the hopper. A vertically oriented condiment chamber is integrally connected to the discharge end of the hopper mechanism and is intended to hold or retain a predetermined amount of the particular condiment as determined by means of a valve mechanism or a weighing gate which is disposed beneath the lower discharge end of the condiment chamber. The valve mechanism or weighing gate is electronically connected to a load cell which will precisely determine the weight of the condiment disposed within the condiment chamber and disposed atop the valve mechanism or weighing gate. When the load cell determines that the proper amount of condiment is disposed atop the valve mechanism or weighing gate, the rotary operation of the auger conveyor is terminated, and the valve mechanism or weighing gate is effectively opened by moving the valve mechanism or weighing gate horizontally beneath and past a vertically oriented scraper mechanism such that the scraper mechanism will ensure that the entire load of the condiment, that was disposed within the condiment chamber and disposed atop the valve mechanism or weighing gate, is removed from the valve mechanism or weighing gate and discharged outwardly from the lower open end portion of the condiment chamber in a vertically downward direction so as to in fact be dispensed or deposited onto a food item which may be, for example, a sandwich bun or piece of bread, which has been previously conveyed beneath the condiment dispensing station. All operations are controlled by means of a programmable logic controller (PLC). In addition, multiple condiment dispensers or dispensing devices can be located at multiple condiment dispensing stations, and the entire system, comprising the multiple condiment dispensing stations, is also electronically connected to a programmable logic controller (PLC) which controls the entire food preparation line, as well as the individual food preparation stations, including all of the condiment dispensing stations, so that food items may be prepared freshly, quickly, and accurately in accordance with multiple food orders ordered by multiple food patrons at a point-of-sale (POS) location.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 1, is operatively connected to an air cylinder actuator such that when actuated, the air cylinder can move the valve mechanism or weighing gate, past a vertically oriented scraper mechanism, such that all condiment material is removed from the valve mechanism or weighing gate and discharged from the lower discharge end portion of the condiment chamber.

DETAILED DESCRIPTION OF THE PREFERRED EMBODIMENT

Figure 1:
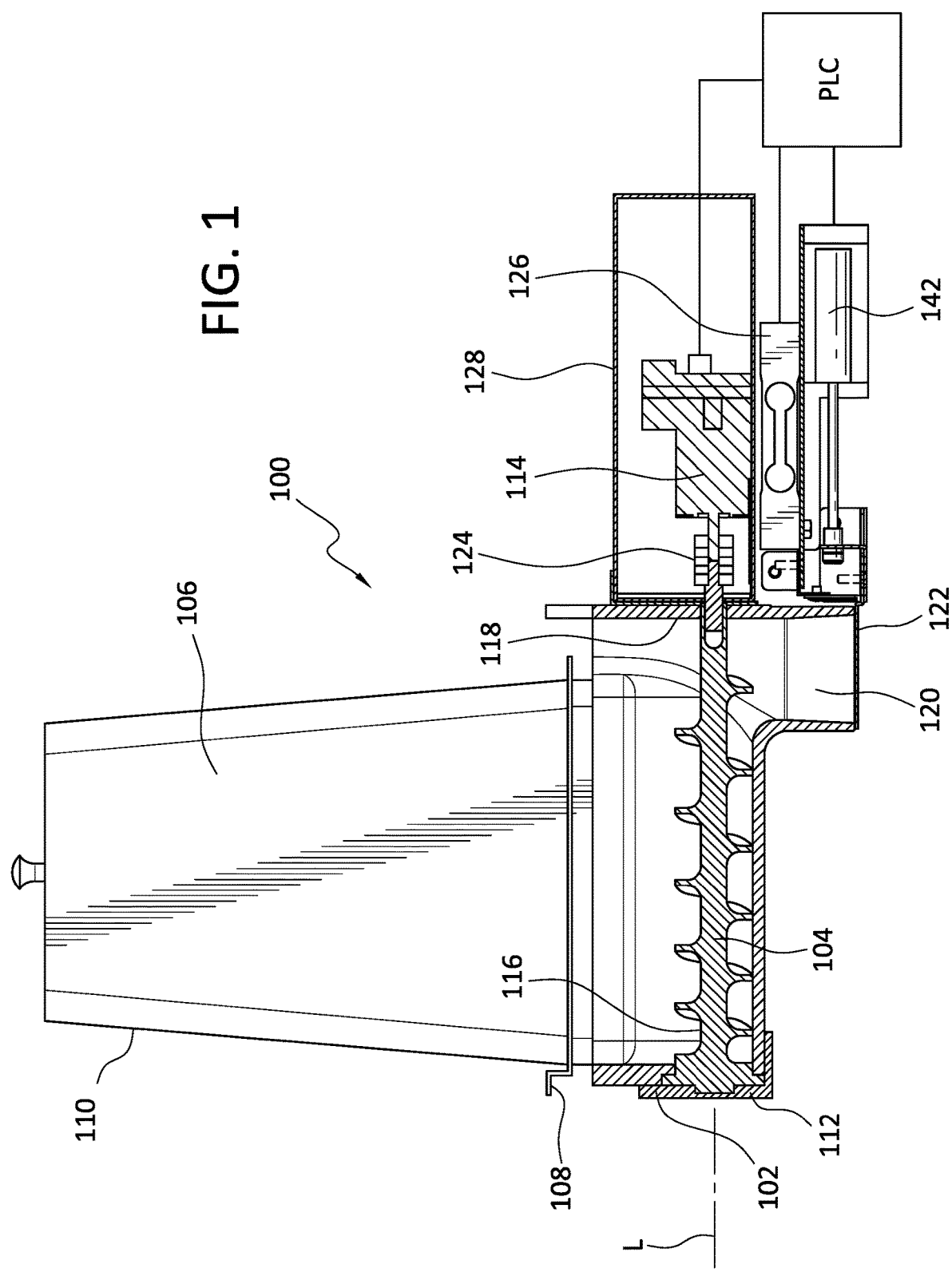
FIG. 1 is effectively a cross-sectional view of the new and improved automated condiment dispensing system as constructed in accordance with the principles and teachings of the present invention and showing the dispensing system when the valve mechanism or weighing gate is disposed at its closed position thereby retaining the condiment within the condiment chamber and preventing the condiment from being discharged onto a food item adapted to be disposed beneath the condiment chamber.

Referring now to the drawings, and more particularly to FIG. 1 thereof, the new and improved automated condiment dispensing system, as constructed in accordance with the principles and teachings of the present invention, is disclosed and is generally indicated by the reference character 100. More particularly, it is seen that the new and improved automated condiment dispensing system 100 comprises a hopper mechanism 102 within the bottom portion of which a progressive auger-type conveyor 104 is rotatably disposed. A condiment charging bin 106 is removably disposed atop the hopper mechanism 102 so as to contain a charge of condiment therein which may be discharged into the hopper mechanism 102 when a horizontally oriented panel, valve, or gate mechanism 108 is opened. The condiment charging bin 106 has a vertically downward, elongated, outwardly tapered configuration such that the largest diametrical portion of the charging bin 106 is disposed adjacent to the hopper mechanism 102. In this manner, condiments can be freely deposited into the hopper mechanism 102 and fully engaged with the auger-type conveyor 104 without encountering any vertical movement impediments. Lastly, the uppermost portion of the condiment charging bin 106 has a cover or lid 110 removably attached thereto so as to permit a fresh charge of condiment to be charged into the charging bin 106 and thereafter maintain the condiment, disposed within the charging bin 106, in a relatively fresh state as a result of the charging bin 106 not being open to the ambient atmosphere.

With reference continuing to be made to FIG. 1, it is also seen that the left or upstream end portion of the auger-type conveyor 104 is adapted to be mounted within a rotary bearing 112 provided upon the hopper mechanism 102 so as to be capable of being rotated around its longitudinal axis L by means of a suitable drive motor 114, as a result of which the auger-type conveyor 104 will move condiments, disposed within the condiment hopper mechanism 102, from the left or upstream end 116 of the hopper mechanism 102 to an oppositely disposed downstream or discharge end 118 of the hopper mechanism 102. A vertically oriented condiment chamber 120 is integrally connected to, or defined within, the discharge end 118 of the hopper mechanism 102 wherein it is appreciated that the vertically oriented condiment chamber 120 defined within the discharge end 118 of the hopper mechanism 102 effectively forms a tubular end portion which is open at its lower or bottom end portion and is adapted to hold or retain a predetermined amount or quantity of the particular condiment as a result of a horizontally oriented, movable valve or weighing gate 122 effectively closing off the open bottom end portion of the condiment chamber 120 of the hopper mechanism 102 when the horizontally oriented, movable valve or weighing gate 122 is disposed at its leftwardmost position as illustrated within FIGS. 1 and 2. More particularly, as can best be appreciated from FIG. 2, the horizontal diametrical extent of the valve or weighing gate 122 effectively bridges diametrically opposite wall portions of the discharge end 118 of the hopper mechanism 102 which define the condiment chamber 120. Examples of suitable condiments may be shredded lettuce, shredded onions, shredded cheese, and the like, although other food items can be envisioned such as, for example, cold cereals, tortilla chips, and the like.

The drive motor 114 may be a suitable, electric drive motor and is operatively connected to the auger-type conveyor 104 by means of a rotary bearing connector 124. A load cell 126 is electronically connected to the valve or weighing gate 122 so as to accurately determine the amount or quantity or weight of the condiment disposed within the condiment chamber 120 and disposed atop the valve or weighing gate 122, the load cell 126 being fixedly mounted beneath the electric drive motor housing 128. As is well-known, the load cell 126 may of course be pre-calibrated to a predetermined load or weight. Accordingly, when the load cell 126 determines that the condiment disposed within the holding chamber 120 is approaching the predetermined amount or quantity or load or weight of the condiment that is desired to be dispensed onto a food item, the load cell 126 will transmit a suitable electrical signal to a central controller or programmable logic controller (PLC), as is illustrated within FIG. 1, whereby the programmable logic controller (PLC) will, in turn, send a signal to the drive motor 114 so as to gradually reduce the rotational speed at which the drive motor 114 is rotating the auger conveyor 104. Subsequently, when the load cell 126 determines that the precise amount or quantity or load or weight of the condiment disposed within the condiment holding chamber 120 and disposed upon the valve or weighing gate 122 has in fact reached the desired predetermined load or weight level, the activation of the drive motor 114 will be terminated as will the rotation of the auger-type conveyor 104 such that no additional condiment is moved into the condiment holding chamber 120 and onto the valve or weighing gate 122.

Figure 2:
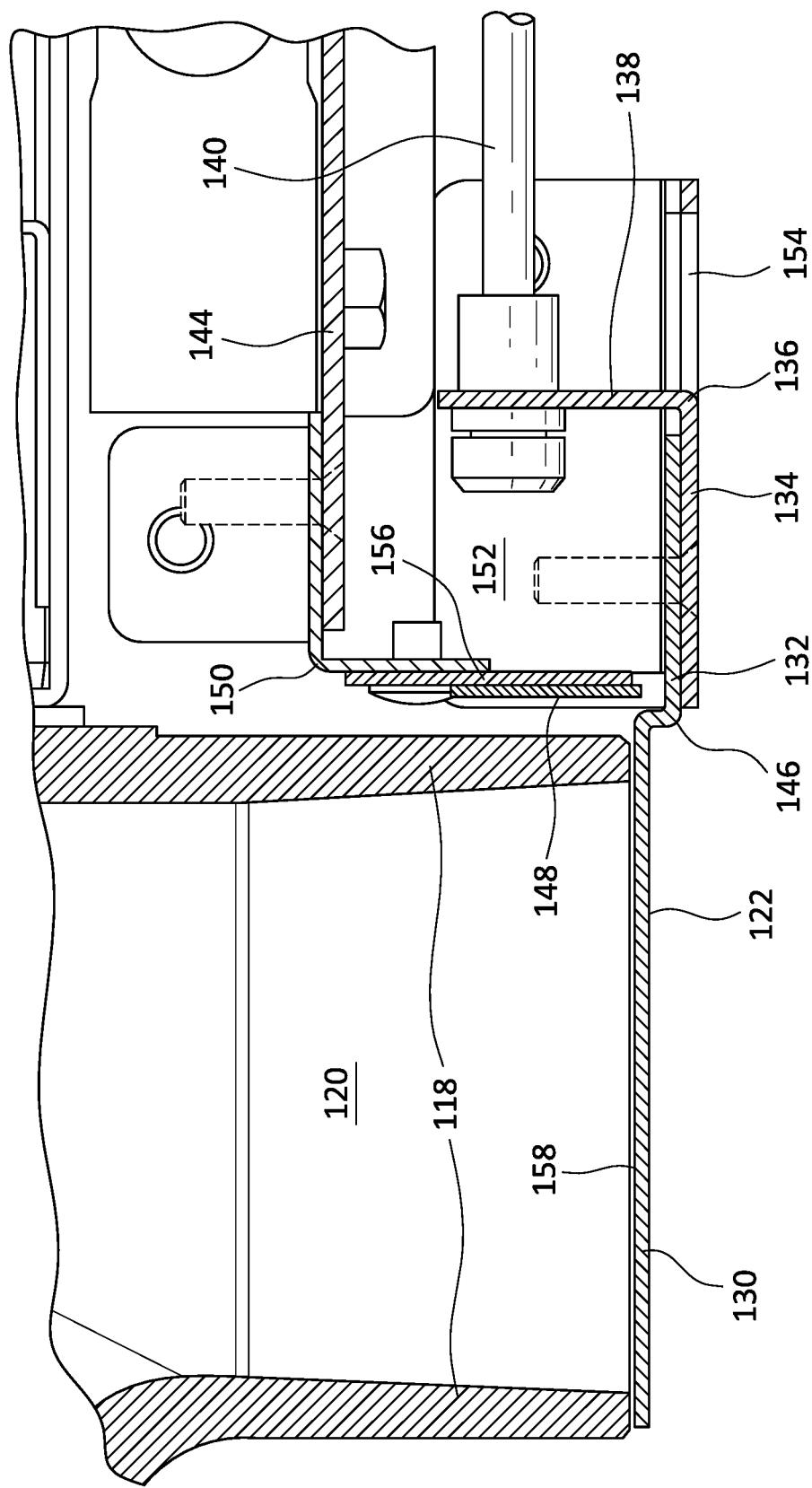
FIG. 2 is an enlarged detailed cross-sectional view disclosing how the valve mechanism or weighing gate, as disclosed within

In addition, as can again best be appreciated from FIG. 2, it is seen that the valve or weighing gate 122 effectively comprises a plate wherein a distal end portion 130 of the plate 122 is disposed beneath the discharge end 118 of the condiment holding chamber 120, when the valve or weighing gate 122 is disposed at its leftwardmost position, as illustrated within FIGS. 1 and 2, so as to effectively close off the discharge end 118 of the condiment holding chamber 120, however, the proximal end portion 132 of the plate 122 is fixedly secured to a horizontally oriented leg portion 134 of an L-shaped bracket 136 which is adapted to be moved in a reciprocal manner within a horizontal plane as a result of a vertically oriented leg portion 138 of the L-shaped bracket 136 being fixedly connected to a piston rod 140 of a dual-movement or dual-actuated pneumatic piston-cylinder assembly 142 as can best be seen in FIG. 1. It is also to be appreciated from FIG. 1 that the pneumatic piston-cylinder assembly 142 is fixedly mounted beneath the load cell housing 144 as can best be seen in FIG. 2, and is also electronically connected to the programmable logic controller (PLC). It is lastly noted that the plate 122 also has an intermediate bent portion 146 next to which there is disposed a vertically oriented scraper 148 which is fixedly mounted to an L-shaped mounting bracket 150 which serves to mount the pneumatic piston-cylinder assembly housing 152 to the bottom wall of the load cell housing 144, and wherein it is also seen that the horizontally oriented leg portion 134 of the L-shaped bracket 136 is movable within a slot 154 of the piston-cylinder assembly housing 152. The scraper 148 may be fabricated from any suitable metal, such as, for example, stainless steel or aluminum, and is adapted to engage the intermediate bent portion 146 of the valve or weighing gate or plate 122.

It is also to be noted, however, that the scraper 148 is fixedly mounted upon a flexible mounting plate 156 which may be fabricated from, for example, a suitable rubber, neoprene, TEFLON® or polytetrafluoroethylene (PTFE), or the like. Accordingly, the scraper 148, as mounted upon the flexible mounting plate 156, is adapted to be pivoted toward the right, when the valve/weighing gate/plate 122 is caused to be moved toward the right by means of the piston rod 140 of the pneumatic piston-cylinder assembly 142 when the pneumatic piston-cylinder assembly 142 causes the entire valve/weighing gate/plate 122 to be moved toward the right when the open discharge end 118 of the hopper mechanism 102 is to be uncovered so as to permit the dispensing or deposition of the condiment from the condiment holding chamber 120 onto a food item. This movement of the piston rod 140 of the piston-cylinder assembly 142 is also under the control of the programmable logic controller (PLC), and it is also to be particularly noted that due to the inherent resiliency of the flexible mounting plate 156, the scraper 148 will always be maintained in contact with the upper surface portion 158 of the valve or weighing gate 122, throughout the entire retraction stroke of the piston 140 of the piston-cylinder assembly 142, so as to ensure that all of the condiment initially disposed upon the upper surface portion 158 of the valve or weighing gate 122 will in fact be scraped off the upper surface portion 158 of the valve or weighing gate 122, forced into the condiment holding chamber 120, and will be permitted to be deposited onto the food item disposed at the condiment dispensing station.

Figure 3:
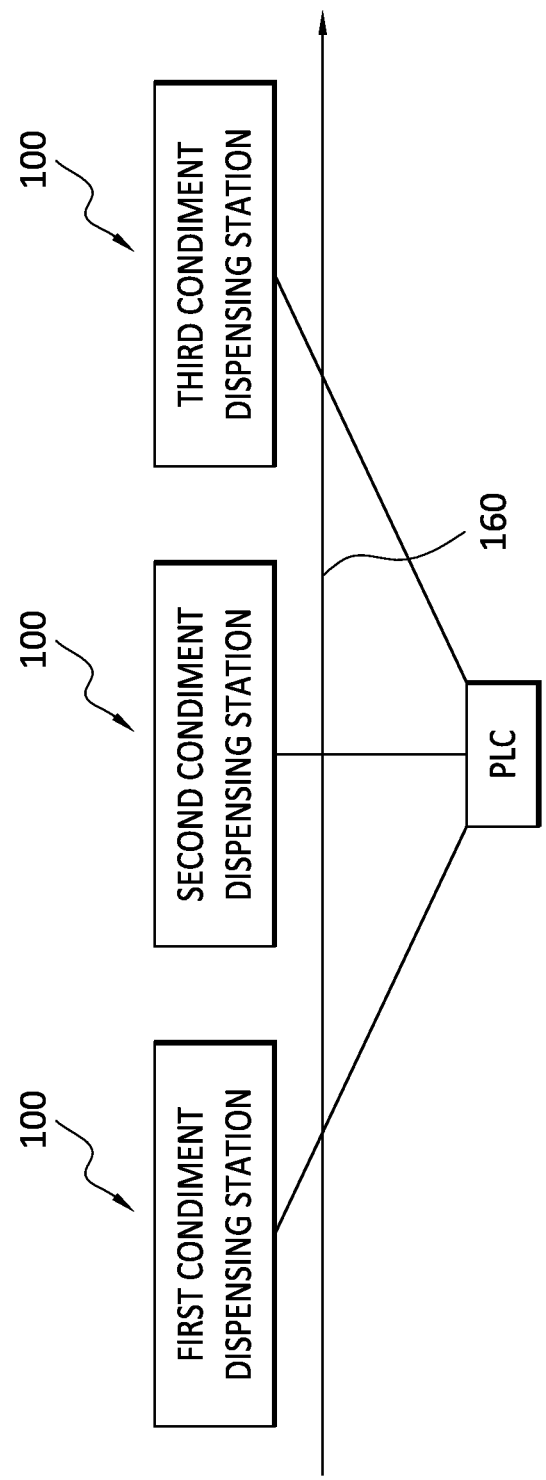
FIG. 3 is a schematic drawing showing a plurality of automated condiment dispensing systems, as has been disclosed within FIGS. 1 and 2, which are located at a plurality of condiment dispensing stations located along a food preparation line, and operatively connected to a central programmable logic controller (PLC) such that the programmable logic controller (PLC) and the plurality of automated condiment dispensing systems are able to communicate with each other by means of two-way communication links whereby various operational parameters of the plurality of automated condiment dispensing systems are able to be communicated to the programmable logic controller (PLC) and the programmable logic controller (PLC) can transmit appropriate control signals to the plurality of condiment dispensing systems such that multiple condiment dispensing operations can be achieved simultaneously.

It is lastly noted, as can best be appreciated from FIG. 3, that an all-encompassing condiment dispensing system of the present invention can include a plurality of condiment dispensing systems 100 under the control of a central programmable logic controller (PLC) which is not only adapted to be electronically connected to individual condiment dispensing systems 100 which may be located at predetermined condiment dispensing stations located at predetermined locations along a food preparation line so as to control the various operations of the various different mechanisms at a particular one of the condiment dispensing stations, such as, for example, the operation of the auger conveyor 104, the processing of signals from the load cell 126 so as to, in turn, control the valve or weighing gate 122 as a result of activating the rotary drive motor 120 and the piston-cylinder assembly 142, but in addition, the central programmable logic controller (PLC) is also adapted to be electronically connected to the plurality of condiment dispensing systems 100 which may be located at a multitude of condiment dispensing stations located at a multitude of predetermined locations along a food preparation line 160 so that the various different condiment dispensing systems 100 can in fact dispense various different condiments or combinations of condiments onto the food items as order at the original point-of-sale (POS) patron order location. It is therefore to be appreciated further that not only does the central programmable logic controller (PLC) control each condiment dispensing system 100 located at each condiment dispensing station, but in addition, the central programmable logic controller (PLC) controls the conveyance of a food item to a particular food preparation station or between the multitude of food preparation stations along the food preparation conveyor line 160 such that food items are properly prepared in accordance with a patron's food order.

For example, let's examine how a hamburger may be made to order. The food preparation line 160 would therefore include, for example, multiple food preparation stations in order to complete the hamburger preparation operation, such as, for example, a hamburger bun toaster station, a hamburger grilling station, and one or more condiment dispensing stations. Considering such a hamburger preparation procedure further, let's assume that a particular food patron has ordered his or her hamburger with shredded lettuce and shredded cheese but no shredded cheese. Therefore, after the hamburger bun has been toasted, and after the hamburger has been properly grilled to either be rare, medium rare, medium, medium-well, or well-done, then in accordance with the food patron's preference, the central programmable logic controller (PLC) advances the conveyor system carrying the hamburger to the first condiment dispensing station which comprises a shredded lettuce condiment dispensing station. Accordingly, a predetermined amount of shredded lettuce will be deposited onto the hamburger. After the deposition of the shredded lettuce onto the hamburger, the programmable logic computer (PLC) will advance the conveyor system of the food preparation line 160 to the second condiment dispensing station. However, the second condiment dispensing station may be, for example, a shredded cheese condiment dispensing station, but in accordance with the patron's food order, the patron does not want shredded cheese on his or her hamburger.

This data or information will have been programmed into the overall food preparation system when the patron initially placed his or her order. Accordingly, the programmable logic controller (PLC) will effectively know to bypass this second condiment dispensing station and will move the conveyor system further along the food preparation line such that the hamburger is now located at the third condiment dispensing station which is a shredded onion dispensing station. In this manner, food items may be prepared freshly, quickly, and accurately in accordance with multiple food orders ordered by multiple food patrons. It is to be lastly noted in accordance with additional teachings and principles of the present invention that a particular condiment dispensing station may effectively comprise a condiment dispensing station wherein such condiment dispensing station will dispense a combination of condiments. For example, data may be derived from hundreds or thousands of patron orders that patrons often desire shredded cheese and shredded lettuce to be deposited onto their hamburgers. Therefore, a particular condiment dispensing station will have its hopper mechanism 102 charged with a mix of shredded cheese and shredded lettuce. In this manner, not only does the patron obtain his or her desired hamburger with the specified condiments, but the operational speed is enhanced since the food preparation conveyor need only be halted at a single condiment dispensing station in lieu of multiple condiment dispensing stations.

Obviously, many variations and modifications of the present invention are possible in light of the above teachings. For example, while a particularly configured condiment charging bin has been disclosed, other condiment charging bins, having different configurations or sizes, are possible. Still further, thermal devices may be employed in connection with the condiment charging bins so as to maintain the condiments relatively hot or relatively cold, depending upon the particular condiment. It is therefore to be understood that within the scope of the appended claims, the present invention may be practiced otherwise than as specifically described herein.

REFERENCE NUMBER KEY

100—Condiment dispensing system
102—Hopper
104—Auger conveyor
106—Condiment charging/holding bin
108—Plate/latch mechanism within bin 106
110—Lid of bin 106
112—Bearing mechanism within upstream end of hopper 102
114—Drive motor for auger conveyor 104
116—Upstream end of hopper 102
118—Discharge or downstream end of hopper 102
120—Condiment holding chamber
122—Weighing gate
124—Rotary bearing connector connecting auger conveyor to motor drive
126—Load cell
128—Motor housing
130—Upstream or distal end of weighing gate 122
132—Downstream or proximal end of weighing gate 122
134—Horizontal leg of L-shaped bracket 136
136—L-shaped bracket
138—Vertical leg of L-shaped bracket 136
140—Piston rod of pneumatic piston-cylinder assembly 142
142—Dual-actuated pneumatic piston-cylinder assembly
144—Upper wall of load cell housing
146—Intermediate bent portion 146 of weighing gate plate 122
148—Scraper
150—L-shaped bracket mounting scraper on lower wall 144 of load cell housing 152
152—Load cell housing
154—Slot within lower wall of load cell housing 152 to permit horizontal leg 134 of L-shaped bracket 136 to slide therein
156—Flexible mounting plate for scraper 148
160—Food preparation line
PLC—Programmable logic controller

What is claimed as new and desired to be protected by Letters Patent, is:

1. An automated condiment dispensing system to be disposed at at least one condiment dispensing station located along a food preparation line, comprising:
   a hopper for containing a supply of a condiment;
   a vertically oriented condiment holding chamber, fluidically connected at its upper end to said hopper, for holding a predetermined amount of the condiment to be deposited onto a food item;
   a conveyor operatively disposed within said hopper for conveying a supply of the condiment from said hopper into said condiment holding chamber;
   a horizontally movable valve mechanism operatively associated with a lower end of said vertically oriented condiment holding chamber for horizontal movement between OPEN and CLOSED positions so as to permit a predetermined amount of condiment to be accumulated within said condiment holding chamber as a result of the condiment being deposited upon an upper surface portion of said horizontally movable valve mechanism when said horizontally movable valve mechanism is disposed at said CLOSED position, and to then be discharged from said condiment holding chamber, in order to deposit the predetermined amount of the condiment onto a food item, when said horizontally movable valve mechanism is moved horizontally to its OPEN position, and to permit a new predetermined amount of condiment to be contained within said condiment holding chamber and upon said upper surface portion of said horizontally movable valve mechanism for deposition onto another food item when said valve mechanism is again moved horizontally to said CLOSED position; and a scraper assembly operatively associated with said valve mechanism so as to be disposed in constant contact with said upper surface portion of said valve mechanism as said valve mechanism is moved from said CLOSED position to said OPEN position so as to ensure that all condiment disposed in contact with said upper surface portion of said valve mechanism is removed from said upper surface portion of said valve mechanism and forced into said condiment holding chamber for discharged deposition onto the food item.

2. The system as set forth in claim 1, wherein:
said conveyor comprises a rotary, auger conveyor.

3. The system as set forth in claim 2, further comprising:
an electric drive motor operatively connected to said rotary, auger conveyor for rotating said auger conveyor so as to advance the condiment through said hopper toward said condiment holding chamber.

4. The system as set forth in claim 3, wherein:
said electric drive motor is operatively connected to said rotary auger conveyor through means of a rotary bearing connector.

5. The system as set forth in claim 3, further comprising:
a programmable logic controller operatively connected to said electric drive motor for controlling the operation of said electric drive motor and said rotary auger conveyor.

6. The system as set forth in claim 1, further comprising:
a load cell electronically connected to said valve mechanism for determining the predetermined amount or load or weight of the condiment accumulated within said condiment holding chamber and deposited upon said valve mechanism.

7. The system as set forth in claim 6, wherein:
said load cell is pre-calibrated to a precise load or weight level for determining the predetermined amount or load or weight of the condiment accumulated within said condiment holding chamber and deposited upon said valve mechanism.

8. The system as set forth in claim 6, further comprising:
a dual-action actuator operatively connected to said valve mechanism for moving said valve mechanism to said OPEN and CLOSED positions.

9. The system as set forth in claim 8, further comprising:
a programmable logic controller operatively connected to said load cell and said dual-action actuator for receiving a first signal from said load cell when the predetermined amount or load or weight of the condiment has been accumulated within said condiment holding chamber and disposed upon said valve mechanism, and for transmitting a second signal to said dual-action actuator so as to move said valve mechanism to said OPEN position in order to permit the predetermined amount of condiment that has been accumulated within said condiment holding chamber and disposed upon said valve mechanism to be discharged from said condiment holding chamber.

10. The system as set forth in claim 8, wherein:
said dual-action actuator comprises a pneumatic piston-cylinder assembly.

11. The system as set forth in claim 1, wherein said scraper assembly comprises:
a metal plate; and
a flexibly resilient mounting plate upon which said metal plate is mounted such that said metal plate is constantly biased into contact with said upper surface portion of said valve mechanism.

12. The system as set forth in claim 11, wherein:
said flexibly resilient mounting plate comprises a material selected from the group comprising polytetrafluoroethylene (PTFE), rubber, and neoprene.

13. The system as set forth in claim 1, wherein:
said system comprises a plurality of condiment dispensing stations disposed along a food preparation line.

14. The system as set forth in claim 13, wherein each one of said plurality of condiment dispensing stations comprises:
a hopper for containing a supply of a condiment;
a condiment holding chamber, fluidically connected to said hopper, for holding a predetermined amount of the condiment to be deposited onto a food item;
a conveyor operatively disposed within said hopper for conveying a supply of the condiment from said hopper into said condiment holding chamber; and
a valve mechanism operatively associated with said condiment holding chamber for movement between OPEN and CLOSED positions so as to permit a predetermined amount of condiment to be accumulated within said condiment holding chamber as a result of being deposited upon an upper surface portion of said valve mechanism, and to then be discharged from said condiment holding chamber, in order to deposit the predetermined amount of the condiment onto a food item, when said valve mechanism is moved to its OPEN position, and to permit a new predetermined amount of condiment to be contained within said condiment holding chamber and disposed upon said upper surface portion of said valve mechanism for deposition onto another food item when said valve mechanism is moved to said CLOSED position.

15. The system as set forth in claim 14, further comprising:
a scraper assembly operatively associated with each one of said plurality of valve mechanisms so as to be disposed in constant contact with said upper surface portion of said valve mechanism as said valve mechanism is moved from said CLOSED position to said OPEN position so as to ensure that all condiment disposed in contact with said upper surface portion of said valve mechanism is removed from said upper surface portion of said valve mechanism and forced into said condiment holding chamber for discharged deposition onto the food item.

16. The system as set forth in claim 13, further comprising:
an electric drive motor operatively connected to a respective one of said plurality of rotary, auger conveyors for rotating said auger conveyor so as to advance the condiment through said hopper toward said condiment holding chamber.

17. The system as set forth in claim 13, further comprising:
   a load cell electronically connected to a respective one of said plurality of valve mechanisms for determining the predetermined amount of condiment accumulated within said condiment holding chamber and deposited upon said valve mechanism.

18. The system as set forth in claim 17, further comprising:
   a dual-action actuator operatively connected to a respective one of said plurality of valve mechanisms for moving said valve mechanism to said OPEN and CLOSED positions.

19. The system as set forth in claim 18, further comprising:
   a programmable logic controller operatively connected to said each one of said plurality of load cells and to each one of said plurality of dual-action actuators of each one of said plurality of plurality of condiment dispensing stations for receiving a first signal from a respective one of said load cells when the predetermined amount of condiment has been accumulated within said condiment holding chamber and disposed upon said valve mechanism, and for transmitting a second signal to a respective one of said dual-action actuators so as to move a respective one of said plurality of valve mechanisms to said OPEN position in order to permit the predetermined amount of condiment that has been accumulated within said condiment holding chamber and disposed upon said valve mechanism to be discharged from said condiment holding chamber.

* * * * *